United States Patent
Dutt et al.

(10) Patent No.: US 8,621,444 B2
(45) Date of Patent: Dec. 31, 2013

(54) RETARGETABLE INSTRUCTION SET SIMULATORS

(75) Inventors: Nikil Dutt, Irvine, CA (US); Mohammad H. Reshadi, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 1752 days.

(21) Appl. No.: 10/599,593

(22) PCT Filed: Sep. 30, 2004

(86) PCT No.: PCT/US2004/032352
§ 371 (c)(1),
(2), (4) Date: Oct. 2, 2006

(87) PCT Pub. No.: WO2005/119439
PCT Pub. Date: Dec. 15, 2005

(65) Prior Publication Data
US 2007/0276646 A1    Nov. 29, 2007

Related U.S. Application Data

(60) Provisional application No. 60/576,643, filed on Jun. 1, 2004.

(51) Int. Cl.
*G06F 9/45* (2006.01)
(52) U.S. Cl.
USPC .............................. 717/138; 717/140; 703/26
(58) Field of Classification Search
None
See application file for complete search history.

(56) References Cited

U.S. PATENT DOCUMENTS

| | | | | |
|---|---|---|---|---|
| 4,794,522 | A * | 12/1988 | Simpson | 703/26 |
| 5,781,758 | A * | 7/1998 | Morley | 703/23 |
| 6,385,757 | B1 * | 5/2002 | Gupta et al. | 716/102 |
| 6,477,683 | B1 * | 11/2002 | Killian et al. | 716/106 |
| 7,058,932 | B1 * | 6/2006 | Jennings et al. | 717/138 |
| 7,107,580 | B2 * | 9/2006 | Zemach et al. | 717/136 |
| 7,607,120 | B2 * | 10/2009 | Sanyal et al. | 717/106 |
| 2002/0066003 | A1 * | 5/2002 | Nevill et al. | 712/209 |
| 2003/0217248 | A1 * | 11/2003 | Nohl et al. | 712/208 |
| 2004/0163074 | A1 | 8/2004 | Decker | |
| 2005/0015754 | A1 | 1/2005 | Werner et al. | |
| 2005/0102493 | A1 * | 5/2005 | DeWitt et al. | 712/227 |
| 2005/0160402 | A1 * | 7/2005 | Wang et al. | 717/114 |

OTHER PUBLICATIONS

Diep et al. "WMW: A Visualization-Based Microarchitecture Workbench", 1995, Computer, vol. 28, issue 2.*

(Continued)

*Primary Examiner* — Chat Do
*Assistant Examiner* — Jue Wang
(74) *Attorney, Agent, or Firm* — Kenneth S. Roberts; One LLP

(57) ABSTRACT

Methods for simulating an instruction set architecture (ISA) with a instruction set simulator (ISS) are provided. One exemplary embodiment of the methods includes fetching a first decoded instruction during a run time, where the decoded instruction is decoded from an original instruction in a target application program during a compile time preceding the run time. The decoded instruction can designate a template configured to implement the functionality of the original instruction. The method also preferably includes determining whether the fetched instruction is modified from the original instruction and then executing the designated template if the instruction was not modified. The method can also include decoding the original instruction during the compile time by selecting a template corresponding to the original instruction and then customizing the template based on the data in original instruction. The method can also include optimizing the customized template during the compile time.

15 Claims, 12 Drawing Sheets

(56) References Cited

OTHER PUBLICATIONS

V. Rajesh, "A Generic Approach to Performance Modeling and Its Application to Simulator Generator", Aug. 1998, Masters Thesis, Department of Computer Science & Engineering, Indian Institute of Technology Kanpur.*

Leupers et al. "Generation of Interpretive and Compiled Instruction Set Simulators", 1999, Proceedings of the ASP-DAC '99.*

Amicel et al. "Matering Startup costs in Assembler-Based Compiled Instruction-Set Simulation", 2002, Proceedings of the Sixth Annual Workshop on Interaction between Compilers and Computer Architectures.*

Cmelik et al. Shade: A Fast Instruction-Set Simulator for Execution Profiling. Technical Report UWCSE 1993-06-06, Department of Computer Science and Engineering, University of Washington, Jun. 1993.

Noël et al. Automatic, Template-Based Run-Time Specialization: Implementation and Experimental Study. Institut De Recherche En Informatique Et Systèmes Aléatoires, Publication interne n° 1065. Nov. 1996.

Reshadi et al. A Framework for Fast, Flexible and Retargetable Instruction-Set Architecture Simulation. CECS Technical Report #03-05, Center for Embedded Computer Systems, University of California, Irvine. Feb. 2003.

Futamura, Y., Partial Evaluation of Computation Process: an Approach to a Compiler-Compiler, Higher-Order and Symbolic Computation 12, 391-391. 1999 (updated and revised version of Partial Evaluation of Computation Process: an Approach to a Compiler-Compiler, Systems, Computers, Controls, vol. 2(5). 1971, pp. 45-50).

Nohl, A. et al., A Universal Technique for Fast and Flexible Instruction-Set Architecture Simulation, DAC 2002.

Halambi, A. et al., Expression: A LAnguage for Architecture Exploration through Compiler-Simulator Retargetability, Date 1999.

Hartoog, M. et al. Generation of Software Tools from Processor Descriptions for Hardware/Software Codesign, DAC 1997.

Reshadi, M. et al., Reducing Compilation Time Overhead in Compiled Simulators, ICCD 2003, Oct. 13-15, 2003, pp. 151-153.

Reshadi, M. et al., Instruction Set Compiled Simulation: A Technique for Fast and Flexible Instruction Set Simulation, DAC 2003, Jun. 2-6, 2003, pp. 758-763.

* cited by examiner

```
#pragma once
#ifndef ARMLIB_INSTRUCTION_DATAPROCESSING_HPP_HEADER_INCLUDED
define ARMLIB_INSTRUCTION_DATAPROCESSING_HPP_HEADER_INCLUDED include "SimpressLib/stdIncludes.h"
include "SimpressLib/instruction/Instruction.hpp"
#include "SimpressLib/val/Reg.hpp"
#include "ARMLib/instruction/lib/Flags.hpp"

namespace ARMLib {
namespace instruction {
template <class Condition, class Operation, class SBit, class RdIsPC, class ShifterOperandType, class RdType, class RnType>
class DataProcessing : public SimpressLib::instruction::Instruction
{
    ShifterOperandType* _shifterOperand;
    RdType* _rd;
    RnType* _rn;

public:
    DataProcessing(ShifterOperandType* shifterOperand, SimpressLib::val::Reg* rd, SimpressLib::val::Reg* rn)
    {
        _shifterOperand = shifterOperand;
        _rd = (RdType*) rd;
        _rn = (RnType*) rn;
    }

~DataProcessing(void)
    {
        delete _shifterOperand;
    } virtual void execute()
    {
        if (Condition::exec())
        {
            Word lhs = _rn->getWord();
            Word rhs = _shifterOperand->getValue();
            Word result = Operation::exec(lhs, rhs);
            _rd->setWord(result);
            if (SBit::value() == true)
            {
                //update flags!
                int CF = lib::Flags::getC();
                int VF = lib::Flags::getV();

Operation::updateC(lhs, rhs, result, &CF);
                Operation::updateV(lhs, rhs, result, &VF);

lib::Flags::setN(NEG(result));
                lib::Flags::setZ((result)? 0 : 1);
                lib::Flags::setC(CF);
                lib::Flags::setV(VF);
            }
        }
    }
};

} //namespace instruction
} //namespace ARMLib
#endif /* ARMLIB_INSTRUCTION_DATAPROCESSING_HPP_HEADER_INCLUDED */
```

```cpp
#pragma once
#ifndef ARMLIB_INSTRUCTION_LOADSTORE_HPP_HEADER_INCLUDED
define ARMLIB_INSTRUCTION_LOADSTORE_HPP_HEADER_INCLUDED include "SimpressLib/stdIncludes.h"
include "SimpressLib/instruction/Instruction.hpp"
#include "SimpressLib/val/Reg.hpp"
#include "SimpressLib/component/storage/memory/MainMemory.hpp"

namespace ARMLib {
namespace instruction {
template <class Condition, class LBit, class ElementType, class AddressingMode2_3Type, class RdType>
class LoadStore : public SimpressLib::instruction::Instruction
{
    AddressingMode2_3Type* _addressingMode2_3;
    RdType* _rd;
    SimpressLib::component::storage::memory::MainMemory* _mainMemory;
public:
    LoadStore(AddressingMode2_3Type* addressingMode2_3, SimpressLib::val::Reg* rd)
    {
        _addressingMode2_3 = addressingMode2_3;
        _rd = (RdType*) rd;
        _mainMemory = ARCH_CALL(getMainMemory());
    }

~LoadStore(void)
    {
        delete _addressingMode2_3;
    } virtual void execute()
    {
        if (Condition::exec())
        {
            Word addr = _addressingMode2_3->getAddress();
            if (LBit::value() == true)
            {//Load
                if ((addr % sizeof(ElementType::type)) !=0)
                    FATAL_ERROR("Invalid address for loading!");

int elemValue = (int) _mainMemory->load<ElementType::type>(addr);
                _rd->setWord(elemValue);
            }
            else
            {//Store
                ElementType::type elemValue = (ElementType::type) _rd->getWord();
                _mainMemory->store<ElementType::type>(addr, elemValue);
            }
        }
    }
};

} //namespace instruction
} //namespace ARMLib
#endif /* ARMLIB_INSTRUCTION_LOADSTORE_HPP_HEADER_INCLUDED */
```

```
#pragma once
#ifndef ARMLIB_INSTRUCTION_MULTILPY_HPP_HEADER_INCLUDED
define ARMLIB_INSTRUCTION_MULTILPY_HPP_HEADER_INCLUDED include "SimpressLib/stdIncludes.h"
include "SimpressLib/instruction/Instruction.hpp"
#include "SimpressLib/val/Reg.hpp"
#include "ARMLib/instruction/lib/Flags.hpp"

namespace ARMLib {
namespace instruction {
template <class Condition, class SBit, class AccumulateBit>
class Multiply : public SimpressLib::instruction::Instruction
{
private:
    SimpressLib::val::Reg* _rd;
    SimpressLib::val::Reg* _rn;
    SimpressLib::val::Reg* _rs;
    SimpressLib::val::Reg* _rm;
public:
    Multiply(SimpressLib::val::Reg* rd, SimpressLib::val::Reg* rn, SimpressLib::val::Reg* rs, SimpressLib::val::Reg* rm)
    {
        _rd = rd;
        _rn = rn;
        _rs = rs;
        _rm = rm;
    }

~Multiply(void)
    {
    } virtual void execute()
    {
        if (Condition::exec())
        {
            Word result = _rm->getWord() * _rs->getWord();
            if (AccumulateBit::value())
                result += _rn->getWord();

_rd->setWord(result);
            if (SBit::value() == true)
            {
                lib::Flags::setN(NEG(result));
                lib::Flags::setZ((result)? 0 : 1);
            }
        }

}
};

} //namespace instruction
} //namespace ARMLib
#endif /* ARMLIB_INSTRUCTION_MULTILPY_HPP_HEADER_INCLUDED */
```

RETARGETABLE INSTRUCTION SET SIMULATORS

FIELD OF THE INVENTION

The invention relates generally to instruction set architecture simulation and more particularly, to systems and methods for generating efficient retargetable instruction set simulators.

BACKGROUND INFORMATION

Instruction-set architecture (ISA) simulators are tools that run on a host machine to mimic the behavior of running an application program on a target machine. Instruction-set simulators are valuable tools in the development of new programmable architectures. They are used to validate architecture and compiler designs, as well as to evaluate architectural design decisions during design space exploration. FIG. 1 depicts a traditional interpretive-simulation technique 10 that is flexible but slow. In interpretive simulation technique 10, an instruction 11 stored in program memory 12 is fetched at 13, decoded at 14, and executed at 15 during run time 16. Since instruction decoding is a time consuming process, the use of interpretive simulation technique 10 can significantly slow the ISA simulation.

FIG. 2 depicts a conventional compiled simulation technique 18 that performs compile time decoding of an application program 20 to improve the simulation performance. Specifically, the application program 20 is compiled in a simulation compiler 21 to create a decoded program 22. That decoded program 22 is passed through a code generation process 23 to create a host assembly 24 stored in program memory 12, which is then executed at 15 by the host 25.

To improve the simulation speed further, static compilation-based techniques, such as compilation technique 18, move the instruction scheduling into the compilation time. However, compiled simulators rely on the assumption that the complete program code is known before the simulation starts and, further more, that the program code is static during run-time. As a result, many application domains are excluded from the utilization of compiled simulators. For example, embedded systems that use external program memories cannot use compiled simulators since the program code is not predictable prior to run-time. Similarly, compiled simulators are not applicable in embedded systems that use processors having multiple instruction sets. These processors can switch to a different instruction set mode at run-time. For instance, the ARM processor uses the Thumb (reduced bit-width) instruction set to reduce power and memory consumption. This dynamic switching of instruction set modes cannot be considered by a simulation compiler 21, since the selection depends on run-time values and is not predictable. Furthermore, applications with run-time dynamic program code, as provided by operating systems (OS), cannot be addressed by compiled simulators.

In recent years, performance of the ISA simulator has steadily grown into one of the most important quality measures for a simulation technique. Also, retargetability has become an important concern, particularly in the area of embedded systems and system-on-chip (SoC) designs. A retargetable ISA simulator would require a generic model, supported by a language, to describe the architecture and its instruction set. The simulator would use the architecture description to decode instructions of the input program and execute them.

However, the creation of a generic model that is efficient in terms of both quality of the architecture description and simulator performance is difficult. To have a high quality description, the model must easily capture the architectural information in a natural, compact and manageable form for a wide range of architectures. Conversely, in order to generate a high performance simulator the model should provide as much static information as possible about the architecture and its instruction set prior to run-time.

Designing an efficient model that captures a wide range of architectures is difficult because each architecture typically has different instruction-set format complexities. Thus, there is a considerable tradeoff between speed and retargetability in ISA simulators. Some retargetable simulators use a very general processor model and support a wide range of architectures but are slow, while others use some architectural or domain specific performance improvements but support only a limited range of processors. Also, in some description languages, deriving a fast simulator requires lengthy descriptions of all possible formats of instructions.

Accordingly, there is a need for improved ISA simulators and simulation methods that address the above concerns and provide advantages over conventional systems and methods.

SUMMARY

Provided herein are improved methods for simulating an instruction set architecture with a instruction set simulator (ISS). One exemplary embodiment of the methods described herein includes fetching a first decoded instruction during a run time, where the decoded instruction is decoded from an original instruction in a target application program during a compile time preceding the run time. Preferably, the decoded instruction designates a template configured to implement the functionality of the original instruction. The method also preferably includes determining whether the fetched instruction is modified from the original instruction and executing the designated template if the instruction was not modified.

The method can also include decoding the original instruction by selecting a template corresponding to the original instruction and customizing the template based on the data in original instruction prior to fetching the decoded instruction. Furthermore, the method can include optimizing the template during the compile time prior to fetching the decoded instruction and, after fetching the instruction, re-decoding the fetched instruction during the run time if the fetched instruction was modified, such that the re-decoded instruction designates a function configured to implement the functionality of the instruction and executing the designated function if the instruction was modified.

Also provided herein is a generic instruction model for use in a instruction set architecture (ISA) simulator. In one exemplary embodiment, the model includes an instruction specification usable to interpret each instruction in an ISA. The instruction specification preferably includes one or more operation classes, where each operation class defines a set of one or more instructions and has an operation mask usable to identify instructions belonging to the class. The operation class also preferably includes one or more symbols and an expression describing the class in terms of the one or more symbols, where each symbol has a corresponding set of one or more symbol types, each symbol type in the set including information usable to determine the symbol when compared to an instruction. In another embodiment of the model, each symbol type can be a constant type, register type or an operation type. Also, at least one operation class can include a plurality of expressions, where each expression is conditional on data within an instruction.

The systems and methods described herein also provide for a retargetable simulation framework for efficient retargeting between ISA's. Preferably, the retargetable simulation framework incorporates the generic instruction model and the generic instruction decoder to model and decode instructions in a target ISA. The generic instruction model and decoder can be used in coordination with any simulation technique, such as the IS-CS method and the like.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. It is also intended that the invention is not limited to require the details of the example embodiments.

BRIEF DESCRIPTION OF THE FIGURES

The details of the invention, including fabrication, structure and operation, may be gleaned in part by study of the accompanying figures, in which like reference numerals refer to like segments.

FIGS. 5A-C depict block diagrams of exemplary embodiments of templates for instruction set architectures.

DETAILED DESCRIPTION

The systems and methods described herein provide improved instruction set architecture (ISA) simulators and methods of generating the same. More specifically, the systems and methods provide a hybrid instruction set-compiled simulation (IS-CS) method that generates fast ISA simulators that combine the benefits of both compiled and interpretive simulation. The systems and methods described herein also provide a generic instruction model capable of capturing a wide range of ISA's and allowing efficient retargetability when implemented in an ISA simulator. The generic instruction model can be implemented with the IS-CS method or with other simulation methods.

The systems and methods described herein are directed towards computer programs, or software, for simulating ISA's and different manners of modeling ISA's in software. The software can be written, modified, implemented, stored or operated on any computing platform suitable for the needs of the application. One of skill in the art will readily recognize that these software systems and methods can be embodied in any computer readable medium and, accordingly, these software systems and methods are not limited to any one computer readable medium. Furthermore, the term "computer" as used herein, refers to any electronic device capable of reading or executing software or program code.

Figure 1:
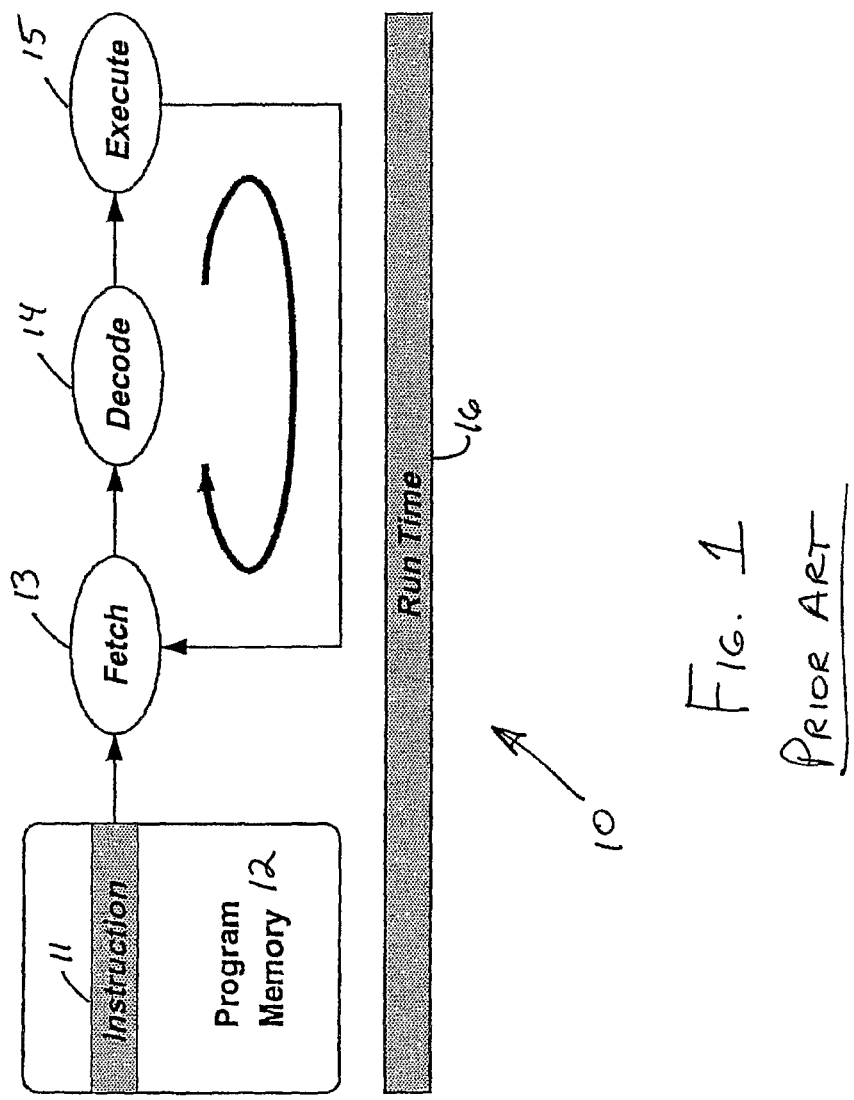
FIG. 1 depicts a flow diagram of a prior art interpretive simulation.
Figure 2:
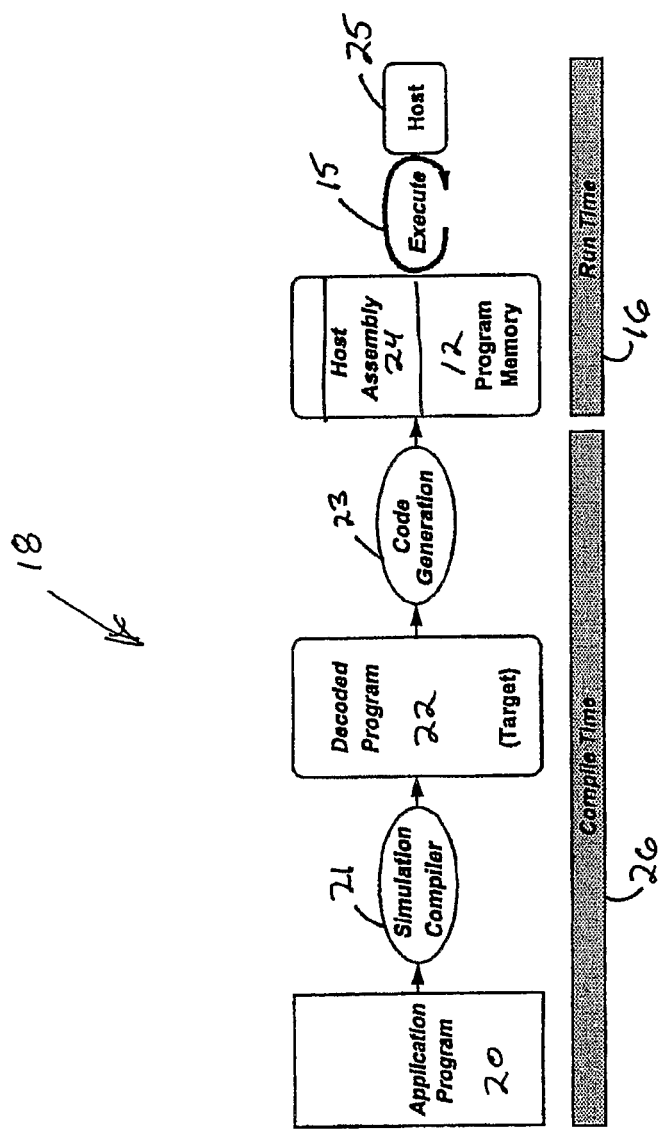
FIG. 2 depicts a flow diagram of a prior art compiled simulation.
Figure 3:
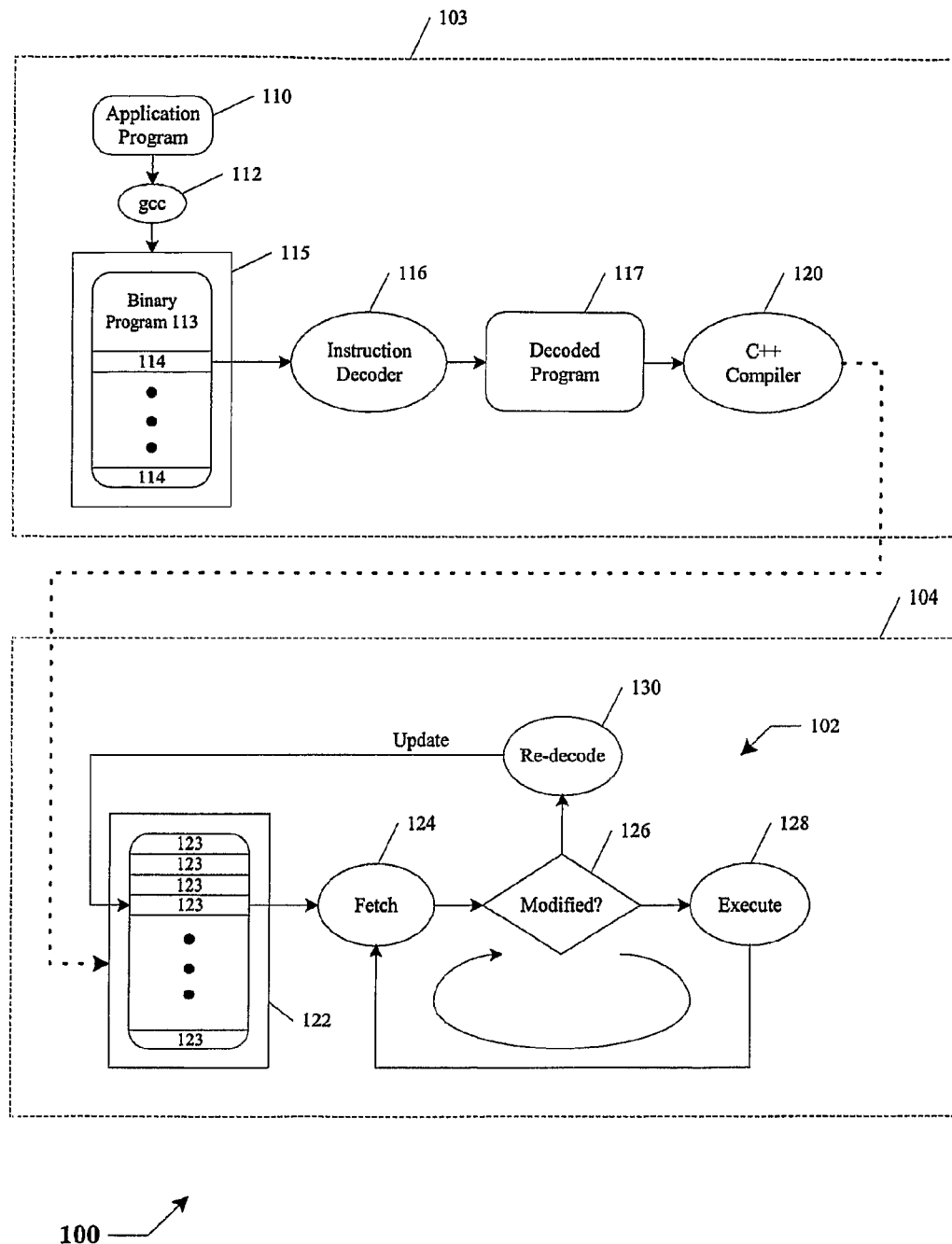
FIG. 3 depicts a flow diagram of one exemplary embodiment of a instruction set compiled simulation method.

FIG. 3 depicts a flow diagram of an exemplary embodiment of an IS-CS method 100. As stated above, the IS-CS method 100 can be used to generate a fast ISA simulator 102 by combining the performance of traditional compiled simulation with the flexibility of interpretive simulation. In the IS-CS method 100, instruction decoding is preferably performed during a compile time 103 and the instruction execution is performed interpretively during a run time 104. The simulator 102 can be configured to recognize if a decoded instruction 123 is modified during the run time 104, in which case the instruction 123 is re-decoded prior to execution. Simulation performance is further improved by a templatized approach that can be used to generate optimized decoded instructions 123.

In this embodiment, the generation of simulator 102 takes place during compile time 103, while the operation of simulator 102 takes place during run time 104. In compile time 103, the target application program 110, which, in this embodiment, is written in C/C++, is compiled using the gcc compiler 112 to generate binary code 113 for the target machine. Although this embodiment is in C/C++, it should be understood that the systems and methods described herein can be written in any computer language suitable for the needs of the application. The target machine is the processor architecture being modeled by the ISA simulator. Any processor architecture can be simulated or modeled with the systems and methods described herein.

Binary code 113 is stored on main memory 115 and includes a plurality of application instructions 114. The instruction decoder 116 decodes one binary instruction 114 at a time to generate the decoded program 117 for the input application program 110. The decoded program 117 is compiled by C++ compiler 120 and linked with the simulation library (not shown) to generate the simulator 102. The compiled decoded instructions 123 are stored in memory 122, which in this embodiment is instruction memory.

During the run time 104, the simulator 102, at 124, fetches one decoded instruction 123 at a time and then determines whether the decoded instruction 123 has been modified from the original instruction 114 at 126. This can be accomplished simply by comparing the binary data values of the fetched decoded instruction 123 with the original instruction 114 contained within main memory 115. If the instruction 123 has not been modified, the simulator 102 proceeds to execute instruction 123 at 128. If the instruction 123 has been modified, the decoded instruction 123 is re-decoded at 130 and updated within instruction memory 122 so that the newly re-decoded instruction 123 can be fetched at 124. The process of fetching, determining whether the instruction 123 was modified, re-decoding (if necessary) and executing continues until all decoded instructions 123 have been executed.

Figure 4A:
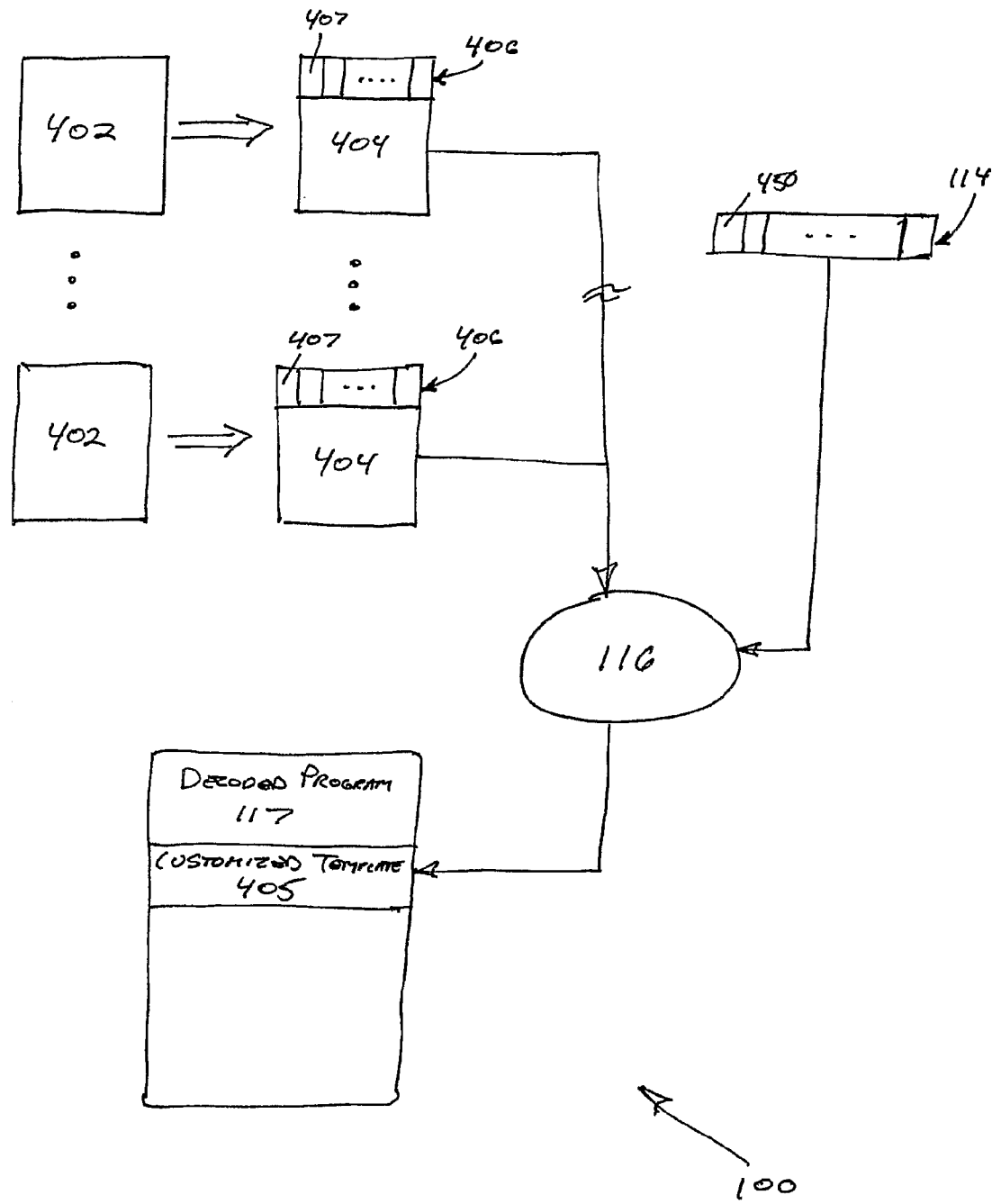
FIG. 4A depicts a block diagram of another exemplary embodiment of an a instruction set compiled simulation method.

IS-CS method 100 preferably uses a templatized approach in decoding the original instructions 114. FIG. 4A is a block diagram depicting the operation of one exemplary embodiment of the instruction decoder 116 in a templatized approach. In the templatized approach, each of the instructions 114 capable of appearing within the ISA are preferably placed in a distinct instruction class 402. Preferably, each instruction class 402 describes a set of instructions having a common behavior, format or function or the like. For instance, in one exemplary embodiment, IS-CS method 100 is used to simulate an ARM processing architecture and the 32-bit ARM instructions 114 are divided into six instruction classes 402: Data Processing; Branch; LoadStore; Multiply; Multiple LoadStore; Software Interrupt; and Swap. Each of these instruction classes 402 share a common format. A template 404 is generated for each instruction class 402. The template 404 is configured to implement the functionality of each instruction 114 in the instruction class 402. For example, the C++ pseudo code for the Data Processing instruction class 402 is shown as the Data Processing template 404 in TABLE 1 below:

TABLE 1

Data Processing Template 404

```
template <class Cond, class Op, class Flag, class SftOper> class
DataProcessing :
{
    SftOper __sftOperand;
    Reg __dest, __src1;
public:
    .......
    virtual void execute( )
    {
        if (Cond::execute( ))
        {
            dest = Op::execute(src1, __sftOperand.getValue( ));
            if (Flag::execute( ))
            {
                // Update Flags
                .......
            }
        }
    }
};
```

The Data Processing template 404 has four parameters: condition; operation; update flag; and shifter operand. The shifter operand parameter is a template 404 having three parameters: operand type; shift options; and shift value.

FIGS. 5A-5C are block diagrams depicting additional exemplary embodiments of templates 404, written in C++, for an ARM ISA. Specifically, FIG. 5A depicts an exemplary embodiment of a template 404 for the DataProcessing instruction class 402, FIG. 5B depicts an exemplary embodiment of a template 404 for the LoadStore instruction class 402 and FIG. 5C depicts an exemplary embodiment of a template 404 for the Multiply instruction class 402.

The use of instruction classes 402 and templates 404 allows for faster simulation during the run time 104. In traditional interpretive simulation (e.g., Simplescalar), the decoding and execution of binary instructions are done using a single monolithic function. This function has many if-then-else and switch/case statements that perform certain activities based on bit patterns of opcode, operands, addressing modes etc. In advanced interpretive simulation (e.g., LISA), the binary instruction is decoded and the decoded instruction contains pointers to specific functions. There are many variations of these two methods based on efficiency of decode, complexity of implementation, and performance of execution. However, none of these techniques utilize the fact that instructions 114 within an instruction class 402 can have a constant value for a particular field of the instruction 114. For example, a majority of the ARM instructions 114 execute unconditionally, i.e., the condition field has value always and it is not time efficient to check the condition each time the instruction 114 is executed.

Preferably, the IS-CS method 100 is based on a partial evaluation technique in order to take advantage of instances where certain input values for the instruction class 402 are known. The partial evaluation technique is well known to one of skill in the art and is discussed in more detail in Y. Futamura, *"Partial Evaluation of Computation Process: an Approach to a Compiler-Compiler"* Systems, Computers, Controls, Volume 2(5), Pages 45-50, 1971, which is fully incorporated by reference herein. The effect of partial evaluation is to specialize a program with part of its input to get a faster version of the same program. To take advantage of such situations separate functions are utilized for each and every possible format of instructions so that the function can be optimized by the compiler at compile time and produce the best performance at run time.

However, the use of separate functions for each possible format is not desirable because, for instance, as will be discussed below, the ARM data processing instructions 114 can include 10,240 possible formats. This is a very large number of formats to generate corresponding functions for. However, classifying the ARM data processing instructions 114 within one single instruction class 402 reduces the number of formats that must be optimized during the compile time 103 and facilitates the implementation of the partial evaluation technique.

Referring back to FIG. 4A, preferably each template 404 has at least one corresponding mask 406 usable to determine instructions 114 that belong to the corresponding instruction class 402. In one exemplary embodiment, the mask 406 is a series of mask positions 407, with each mask position 407 corresponding to one bit position in the instruction 114. Each mask position can be either a binary one value ('1'), a binary zero value ('0') or a do not care value ('x'). The following masks 406 are exemplary masks 406 for the Data processing instruction class 402:

"xxxx-001x xxxx-xxxx xxxx-xxxx xxxx-xxxx"
"xxxx-000x xxxx-xxxx xxxx-xxxx xxx0-xxxx"
"xxxx-000x xxxx-xxxx xxxx-xxxx 0xx1-xxxx"

Preferably, an instruction 114 being decoded by decoder 116 is compared with each of the masks 406 for each template 404 until a match is found. For each mask position 407 having a binary one value, a matching instruction 114 would also have a binary one value in the corresponding bit position 450. Likewise, for each mask position 407 having a binary zero value, a matching instruction 114 would also have a binary zero value in the corresponding bit position 450. Mask positions 407 having a do not care value are ignored. Once a matching mask 406 is found, the corresponding template 404 is selected.

Instruction decoder 116 then preferably customizes the selected template 404 by extracting values from the instruction 114 and assigning those values to parameters within the template 404 to generate a customized template 405. In one exemplary embodiment, a set of processes are used by decoder 116 to select and customize each template 404. The following three processes 1-3 shown in TABLE 2 are exemplary processes capable of selecting a template 404 and generating customized template 405 in the simulation of an ARM ISA:

TABLE 2

```
Process 1-Instruction Decoding
Inputs: Application Program Appl (Binary), MaskTable maskTable.
Output: Decoded Program DecodedProgram.
Begin
    TempProgram = { }
    foreach binary instruction inst with address addr in Appl
        template = DetermineTemplate(inst, maskTable)
        templateinst = CustomizeTemplate(template, inst)
        newStr = "InstMemory[addr] = new templateinst"
```

TABLE 2-continued

```
    TempProgram = AppendInst(TempProgram, newStr)
    endfor
    DecodedProgram = Compile(TempProgram)
End
Process 2-DetermineTemplate
Inputs: Instruction inst (Binary), and Mask Table maskTable.
Output: Template.
Begin
    foreach entry < mask; template > in Mask Table
        if mask matches inst
            return template
    endfor
End
Process 3-CustomizeTemplate
Inputs: Template template, Instruction inst (Binary).
Output: Customized Template with Parameter Values.
Begin
    switch instClassOf(inst)
        case Data Processing:
            switch (inst[31:28])
                case 1110: condition = Always endcase
                case ....
                ...
            endswitch
            switch (inst[24:21])
                case 0100: opcode = ADD; endcase
                case ....
                ...
            endswitch
            ......
            return template < condition; opcode; :::::: >
        endcase /* Data Processing */
        case Branch: ... endcase
        case LoadStore: ... endcase
        case Multiply: ... endcase
        case Multiply LoadStore: ... endcase
        case Software Interrupt: ... endcase
        case Swap: ... endcase
    endswitch
End
```

Process 1 decodes one binary instruction 114 at a time to generate the decoded program 410 for the input application 110. For each instruction 114 in the application binary 113, process 1 selects the appropriate template 404 using process 2. Process 1 then calls process 3 to generate a customized template 404 for the instruction 114 using the appropriate parameter values from the instruction 114. Process 3 preferably extracts the values from specified fields of the instruction 114 and assigns those values to the template 404. Once customized, the template 405 is instantiated and appended into the decoded program 117 as depicted in FIG. 4A.

Figure 4B:
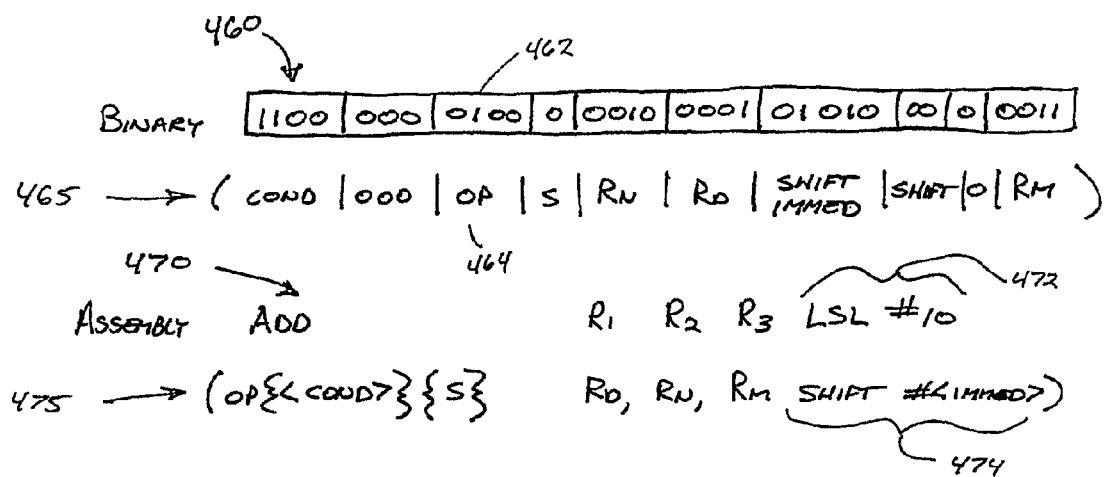
FIG. 4B depicts a block diagram of an example of a binary instruction and corresponding assembly code.

FIG. 4B is a block diagram depicting the binary code 460 and assembly code 470 of one exemplary Data Processing instruction 114 in an ARM ISA. The corresponding code 465 with symbols 464 depicted below each binary field 462 represent a one-to-one mapping (i.e., binary encoding) of that symbol 464 and the corresponding binary field 462. The code 475 depicted below the assembly code 470 shows the assembly syntax for each assembly field 472 using symbols 474 of the corresponding instruction type as extracted from the processor manual.

Using processes 1-3, instruction decoder 116 selects the Data Processing template 404 described above and outputs the following customized template 405 shown in TABLE 3:

TABLE 3

Customized Template 405 for Data Processing Instruction of FIG. 4B

```
void DataProcessing<Always, Add, False, SftOper<Reg, ShiftLeft,
Imm>>::execute( )
{
    if (Always::execute( ))
    {
        __dest = Add::execute(__src1, __sftOperand.getValue( ));
        if (False::execute( ))
        {
            // Update Flags
            ...
        }
    }
}
```

As mentioned above, this customized template 405 is appended into decoded program 117 and then compiled in compiler 120, which, in this embodiment, is again a C++ compiler. During compilation in compiler 120, several optimizations occur on the execute ( ) function in the customized template 405 of TABLE 3. The Always::execute( ) function call is evaluated to true, thereby removing the check step. Similarly, the function call False::execute( ) is evaluated to false. As a result, the branch and the statements inside it are removed by the compiler 120. Also, the two function calls, Add::execute( ), and sftOperand.getValue( ), are inlined as well, i.e., each function call is replaced by the body of that function to reduce the overhead of the function call. Consequently, the customized template 405 is optimized and the execute( ) function becomes one single statement as shown below in TABLE 4:

TABLE 4

Template 405 for Data Processing Instruction

```
void DataProcessing<..skipped..>::execute( )
{
    __dest = __src1 + __sftOperand.__operand << 10;
}
```

Furthermore, in many ARM instructions 114, the shifter operand is a simple register or immediate. Therefore, the shift operation is actually a no shift operation. The use a no shift operation enables further optimization of template 405. In this way, an instruction 114 similar to the above example would have only one operation in its execute( ) method.

The decoded program 117 generated by the compiler 120 is preferably loaded into instruction memory 122. Each decoded instruction 123 entry preferably includes the decoded instruction binary values and a pointer to the optimized template 405 for that instruction 123. The decoded instruction binary 123 is preferably stored at an address corresponding to the address of the original instruction binary 114 in memory 115, which in this embodiment is main memory.

As mentioned above, during the run time 104, each decoded instruction 123 is fetched and checked to determine if the instruction 123 has been modified. Preferably, this occurs simply by comparing the decoded instruction binary 123 in instruction memory 122 with the original instruction binary 114 located at the corresponding address in main memory 115. If the two instruction binaries 123 and 114 match, then the instruction 123 has not been modified. If the two instruction binaries 123 and 114 do not match, then the instruction 123 has been modified and is re-decoded at 130.

The re-decoding process that occurs at 130 is preferably similar to that performed by instruction decoder 116, except that the re-decoded instruction 123 points to an appropriate function instead of a template 404. In addition to generating one template 404 for each instruction class 402, one function can also be generated for each instruction class 402. The function preferably implements the functionality of the instruction 114. The same mask 407 used to identify the proper template 404 can be used to identify the proper function for the instruction 123. In one exemplary embodiment, a mask table is maintained that cross references each template 404 and function with the proper mask 407.

The execution of re-decoded instructions 123 involves executing the function pointed to by the re-decoded instruction 123. Since the number of instructions 123 modified during the run time 104 can be minimal, using a general unoptimized function for simulating the instruction 123 likely will not significantly degrade performance. One of skill in the art will readily recognize that the manner of decoding and executing modified instructions can be varied according to the needs of the simulator 102 and overall application. For instance, interpretive techniques can be used as well as a templatized approach and the like.

Generation of the templates 404 for each instruction class 402 can be performed manually or automatically. The information necessary to determine each instruction class 402 and generate each template 404 can be derived from the processor specification using an Architecture Description Language (ADL) such as LISA, EXPRESSION, nML and the like. The LISA ADL is discussed in A. Nohl et al. "*A Universal Technique for Fast and Flexible Instruction-Set Architecture Simulation,*" DAC 2002, which is fully incorporated by reference herein. The EXPRESSION ADL is discussed in A. Halambi et al. "*EXPRESSION: A LAnguage for Architecture Exploration through Compiler/Simulator Retargetability,*" DATE 1999, which is fully incorporated by reference herein. The nML ADL is discussed in M. Hartoog et al. "*Generation of Software Tools from Processor Descriptions for Hardware/Software Codesign,*" DAC 1997, which is also fully incorporated by reference herein.

The IS-CS method 100 significantly reduces compilation time in the generation of ISA simulators. This is because, in part, the IS-CS method 100 generates the source code of a simulator 102 that is customized to decode the input program 113 instead of generating source code that is the equivalent of the input program 113. In traditional static compiled simulation, each instruction 114 in the input program 113 has corresponding code in the generated source code. However, the IS-CS method 100 preferably uses a templatized approach where instead of repeatedly generating source code for instruction instances, customized code is generated for each instruction class 402 existing in the target ISA. Since the number of instruction classes 402 is less than the number of instructions 114, the resulting decoded program 117 is smaller and requires considerably less time to compile in compiler 120.

The decoded program 117 can be compiled and optimized to generate a simulator 102 that decodes the input program 114 again during run time 104. Thus, the IS-CS method 100 combines the benefits of both traditional compiled simulation and interpretive simulation. The compilation time advantages of the IS-CS method 100 are further discussed in M. Reshadi et al. "*Reducing Compilation Time Overhead in, Compiled Simulators*" ICCD 2003, Oct. 13-15, 2003, pp. 151-153, which is fully incorporated by reference herein. The IS-CS method 100 is also generally described in M. Reshadi et al. "*Instruction Set Compiled Simulation: A Technique for Fast and Flexible Instruction Set Simulation*" DAC 2003, Jun. 2-6, 2003, pp. 758-763, which is fully incorporated by reference herein.

Figure 6A:
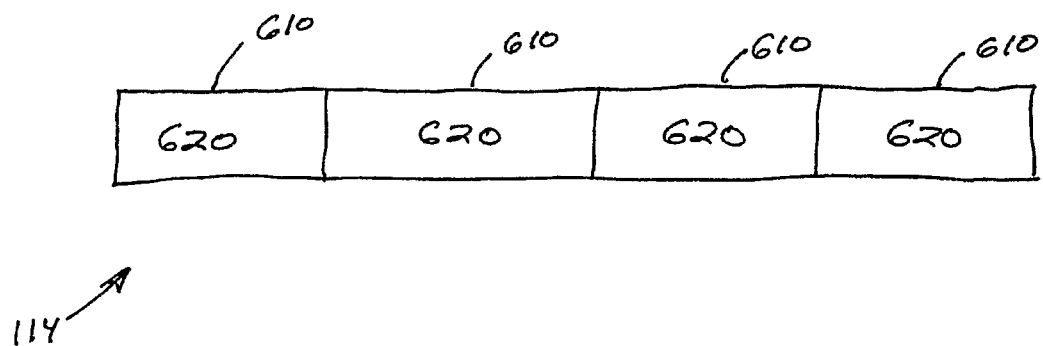
FIG. 6 depicts a block diagram of an exemplary embodiment of a generic instruction model.

As mentioned above, the systems and methods described herein also provide for a generic instruction model capable of modeling a wide range of ISA's and allowing an ISA simulator to be efficiently retargeted from one ISA to another. FIG. 6A depicts one exemplary embodiment of a generic instruction model 600 for modeling a target ISA. In this embodiment, each instruction 114 is modeled as a series of slots 610. For instance, the instruction 114 can be described as:

$$I = <sl_0, sl_1, \ldots>$$

where I is the instruction and $sl_i$ is the slot.

Figure 6B:
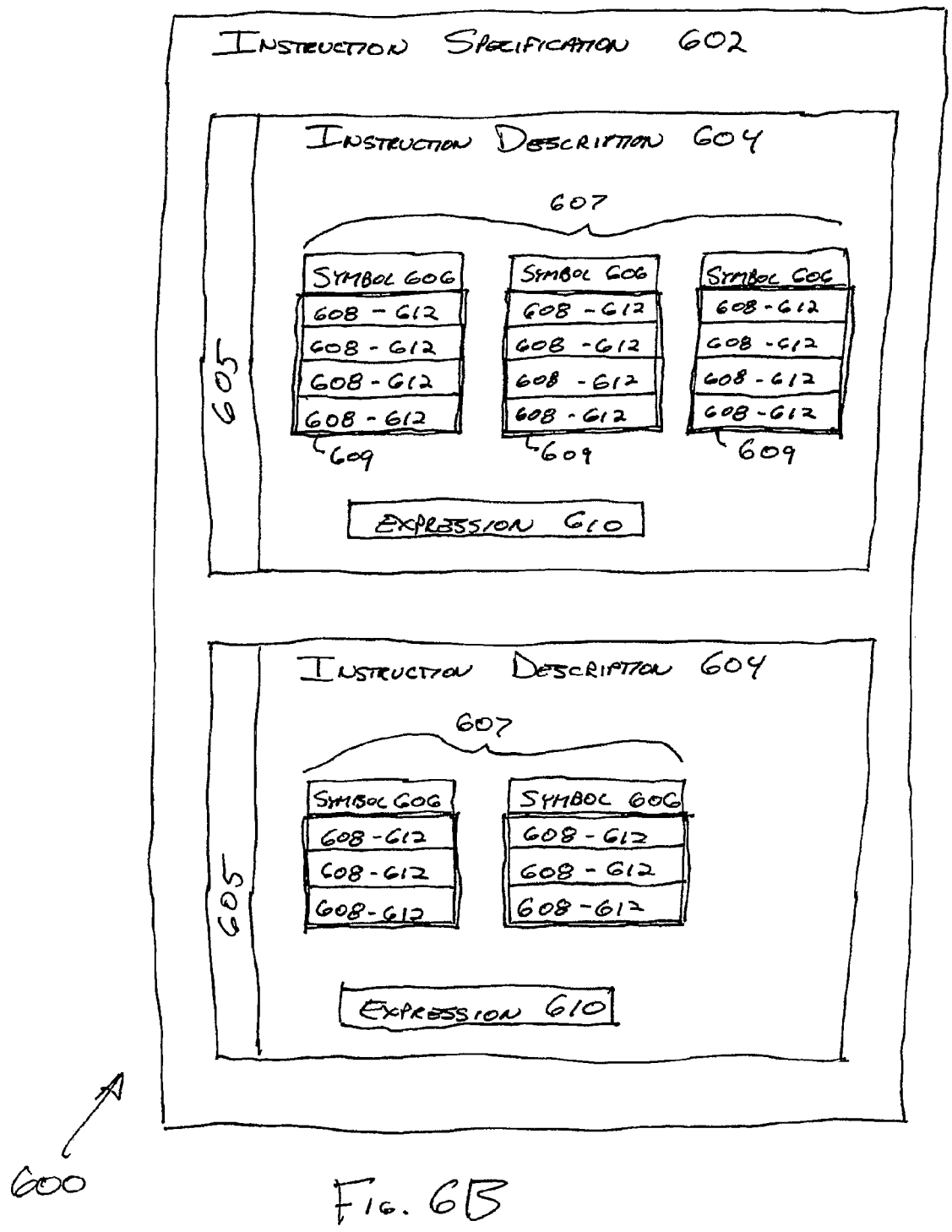

Although the instruction 114 includes four slots 610 in FIG. 6B, any number of slots 610 can be included as desired. Each slot 610 preferably contains only one operation 620 from an operation set. All operations 620 in an instruction 114 can operate in parallel and each operation 620 is preferably identifiable by information 612, which in this embodiment is a mask 612. Thus, each slot 610 can be modeled as a set of operation-mask pairs ($op_i$, $m_i$) where the length of the operation 620 is equal to the length of the mask 612 associated with the operation 620. For instance, $$sl_i = <(op_i^0, m_i^0)|(op_i^1, m_i^1)|\ldots>$$

Each instruction 114 is also placed in an instruction class 402, such that the instructions 114 within the class 402 share a common behavior, format, function or the like. Each of the operations 620 that can appear in any slot 610 of an instruction 114 are also preferably grouped together into the instruction class 402. The previous slot 610 description can be rewritten using the instruction class 402:

$$sl_i = <(class_i, m_i)>$$

where $class_i$ is the instruction class 402.

For example, integer arithmetic instructions in Sparc V7 can be grouped in a class 402 referred to as IntegerOps and shown below:

$$I_{SPARC} = <(IntegerOps, 10xx\text{-}xxx0xxxx\text{-}xxxx\ xxxx\text{-}xxxx\ xxxx\text{-}xxxx)|\ldots>$$

FIG. 6B depicts a block diagram of another exemplary embodiment of generic instruction model 600. Here, generic instruction model 600 includes an instruction specification 602 for describing the target ISA. The instruction specification 602 includes one or more instruction descriptions 604. Each instruction description 604 preferably contains the information for modeling one instruction class 402. The instruction description 604 can include a set 607 of one or more symbols 606, each having a corresponding set 609 of symbol types 608. Each symbol type 608 describes one format, value or operation that symbol 606 can assume. The instruction description 604 includes an expression 610, which describes the instruction class 402 in terms of the symbols 606 within the class 402. The instruction description 604 also preferably includes information 605 usable to identify instructions 114 described by the instruction description 604. In this embodiment, the information 605 is a mask, which operates in a manner similar to the mask 406 described above.

In this embodiment, each instruction class 402 is preferably described in a separate instruction description 604. The symbols 606 within the instruction description 604 are used to model the various operations 620 that can occur in a given slot 610. For instance, the IntegerOps class 402 includes four symbols 606: opcode; dest; src1; and src2 and the expression 610 for the IntegerOps class 402 would be the following:

$$dest = f_{opcode}(src1, src2)$$

Associated with each symbol 606 is the symbol type set 609. Each symbol 606 can have a different type 608 depending on the bit pattern of the operation 620 in the instruction 114. The instruction class 402 can then be defined as:

$$class=\langle (s_0,T_0),(s_0,T_1),\ldots |exp(s_0,s_1,\ldots)\rangle$$

where $(s_i, T_i)$ are (symbol 606, type set 609) pairs and $exp(s_0, s_1, \ldots)$ is the expression 610 of the symbols 606 based on the values of the operations 620.

Preferably, the symbol 606 can be static or dynamic. For example, the possible types 608 for the src2 symbol 606 are register 608 and immediate integer 608. The value of a register symbol 606 is dynamic and is known during the run time 104, whereas the value of an immediate integer symbol 606 is static and is known during the compile time 103. In this embodiment, the type 608 of each symbol 606 can be defined as a register ($\in$ Registers), constant ($\in$ Constants) or can be based on an operation 620 or micro-operation ($\in$ Operations). For example, a data processing instruction 114 in ARM (e.g., add) uses a shift micro-operation to compute the second source operand, known as ShifterOperand.

Each possible type 608 of a symbol 606 is preferably associated with information 612 usable to identify the symbol 606 when compared to the instruction 114. Because each operation 620 is modeled with a symbol 606, in this embodiment the mask 612 is used to identify the symbol 606. The mask 612 preferably contains a series of mask positions having binary one values ('1'), binary zero values ('0') and/or do not care values ('x') similar to the mask 407 described above. Possible types 608 of a symbol 606 can be defined as:

$$T=\{(t,m)|t\in Operations\cup Registers\cup Constants, m\in (1|0|x)^*\}$$

For example, the opcode symbol 606 can have an OpTypes type set 609 including various types 608 of opcode 606, such as Add, Subtract ("Sub") and the like. Each type 608 has an associated mask 612 as shown below in TABLE 5:

TABLE 5

```
OpTypes = {
    (Add, xxxx-xxxx 0000-xxxx xxxx-xxxx xxxx-xxxx),
    (Sub, xxxx-xxxx 0100-xxxx xxxx-xxxx xxxx-xxxx),
    ... }
```

This embodiment provides freedom in describing the operations 620 because each symbol 606 is not directly mapped to contiguous bits in the instruction 114 and a symbol 606 can correspond to multiple bit positions in the instruction binary 114.

In this embodiment of the generic instruction model 600, the register is defined by a class (regClass) and an index. The index of a register in an instruction 114 can be identified by interpreting the relevant portion of the instruction binary 114 as an unsigned integer. An instruction 114 can also identify a specific register with a fixed index, as in a branch instruction 114 that updates a program counter. In this embodiment, a register is defined by:

$$register=[regClass,i,j]|[regClass,index]$$

where i and j define the boundary of the relevant index portion of the instruction binary 114.

For example, the dest symbol 606 can be found in the 25th to 29th bits of the instruction 114 and is an integer register type 608. The type 608 (DestType) of the dest symbol 606 can be described as:

$$DestType=[IntegerRegClass,29,25]$$

where IntegerRegClass is the register class.

As mentioned above, a symbol type 608 can also be a constant. For example, one bit in an instruction 114 can be interpreted as a Boolean type, or a set of bits in an instruction 114 can be interpreted as an integer immediate. It is also possible to have constants with fixed values in the instruction 114. A constant type 608 is defined as the following:

$$c=\#type,j\#|\#type,value\#$$

where i and j show the bit positions of the constant and the type 608 is a scalar type 608 such as an integer, Boolean, float and the like.

An exemplary embodiment of an instruction specification 602 for a SPARC processor is depicted in TABLE 6 below:

TABLE 6

```
SPARCInst = $
    (IntegerOps, 10xx-xxx0 xxxx-xxxx xxxx-xxxx xxxx-xxxx) | ...
$;
IntegerOp = <
    (opcode, OpTypes), (dest, DestType), (src1, Src1Type),
    (src2, Src2Type) | { dest = opcode(src1, src2); }
>;
OpTypes = {
    (Add, xxxx-xxxx 0000-xxxx xxxx-xxxx xxxx-xxxx),
    (Sub, xxxx-xxxx 0100-xxxx xxxx-xxxx xxxx-xxxx),
    (Or , xxxx-xxxx 0010-xxxx xxxx-xxxx xxxx-xxxx),
    (And, xxxx-xxxx 0001-xxxx xxxx-xxxx xxxx-xxxx),
    (Xor, xxxx-xxxx 0011-xxxx xxxx-xxxx xxxx-xxxx),
    ...
};
DestType = [IntegerRegClass, 29, 25];
Src1Type = [IntegerRegClass, 18, 14];
Src2Type = {
    ([IntegerRegClass,4,0], xxxx-xxxx xxxx-xxxx xx0x-xxxx xxxx-xxxx),
    (#int,12,0#, xxxx-xxxx xxxx-xxxx xx1x-xxxx xxxx-xxxx)
};
```

As an additional example, the instruction specification 602 for an ARM processor is depicted in TABLE 7 below:

TABLE 7

```
ARMInst = $
    (DPOperation, xxxx-001x xxxx-xxxx xxxx-xxxx xxxx-xxxx) |
    (DPOperation, xxxx-000x xxxx-xxxx xxxx-xxxx xxx0-xxxx) |
    (DPOperation, xxxx-000x xxxx-xxxx xxxx-xxxx 0xx1-xxxx) |
    ...
$;
DPOperation = <
    (cond, Conditions), (opcode, Operations), (dest, [intReg,15,12]),
    (src1, [intReg,19,16]), (src2, ShifterOperand),
    (updateFlag, {(true, mask(32, 20, "1"), (false, mask(32, 20, "0")})
    | {
        if (cond( )) {
            dest = opcode( src1, src2);
            if (updateFlags) {/*Update flags*/}
        }
    }
>;
Conditions = {
    (Equal, mask(32, 31, "0000"), (NotEqual, mask(32, 31, "0001"),
    (CarrySet, mask(32, 31, "0010"), (CarryClear, mask(32, 31, "0011"),
    ..., (Always, mask(32, 31, "1110"), (Never, mask(32, 31, "1111")
};
Operations = {
    (And, mask(32, 24, "0000"), (XOr, mask(32, 24, "0001"),
    (Sub, mask(32, 24, "0010"), (Add, mask(32, 24, "0100"), ...
};
```

TABLE 7-continued

```
ShifterOperand = <
   (op, {([intReg,11,8], mask(32,4,"0")), (#int,11,7#,
   mask(32,7,"0xx1"))}),
   (sh, {(ShiftLeft, mask(32,6,"00")), (ShiftRight, mask(32,6,"01")), ...}),
   (val, {([intReg,3,0], mask(32,25,"0")), (#int,7,0#, mask(32,25,"1"))})
   | { sh(op, val) }
>;
```

In this exemplary embodiment, the ARM ISA is divided into six instruction classes 402: Data Processing; Branch; LoadStore; Multiply; Multiple LoadStore; Software Interrupt; and Swap. The ARM ISA has conditional 32-bit instruction formats. In the Data Processing instruction class 402 (DPOperatioin), if the condition (16 possibilities) is true, then an arithmetic operation 620 (16 possibilities) is performed on two source operands and the result is written in the destination operand, which are modeled as symbols 606 within the Data Processing instruction description 604. The destination operand 606 and the first source operand 606 are registers. The second source operand 606, referred to as ShifterOperand, has three fields, each of which are also modeled as a symbol 606: shift operand 606, having a register type 608 and an immediate type 608, shift operation 606 having five types 608; and shift value 606 having a register type 608 and an immediate type 608. The shift value 606 shows the number of shifts that must be performed on the shift operand 606 by the specified shift operation 606. For example, "ADD r1, r2, r3 sl #10" is equivalent to "r1=r2+(r3<<10)." If indicated in the instruction opcode 606, the flag bits (Z, N, C, and V) are updated. Therefore, 16×16×(2×5×2)×2=10,240 formats of instructions binaries are possible in this instruction class 402. All of these formats are covered by the description 602 of TABLE 7.

In the code shown in TABLE 7, the generic instruction model 600 also includes a set of macros that can be used for compact description. For example, the mask (8, 2, "10") macro generates an 8 bit mask that has a '10' at position 2, i.e., xxxx-x10x. Although a discrete number of the various elements of instruction set 602 are shown, such as instruction descriptions 604, mask 605, symbols 606, symbol types 608, type sets 609 and type masks 612, it should be understood that any number of these various elements can be used in generic model 600 as needed by the application or as desired by the user in modeling the ISA.

Figure 7:
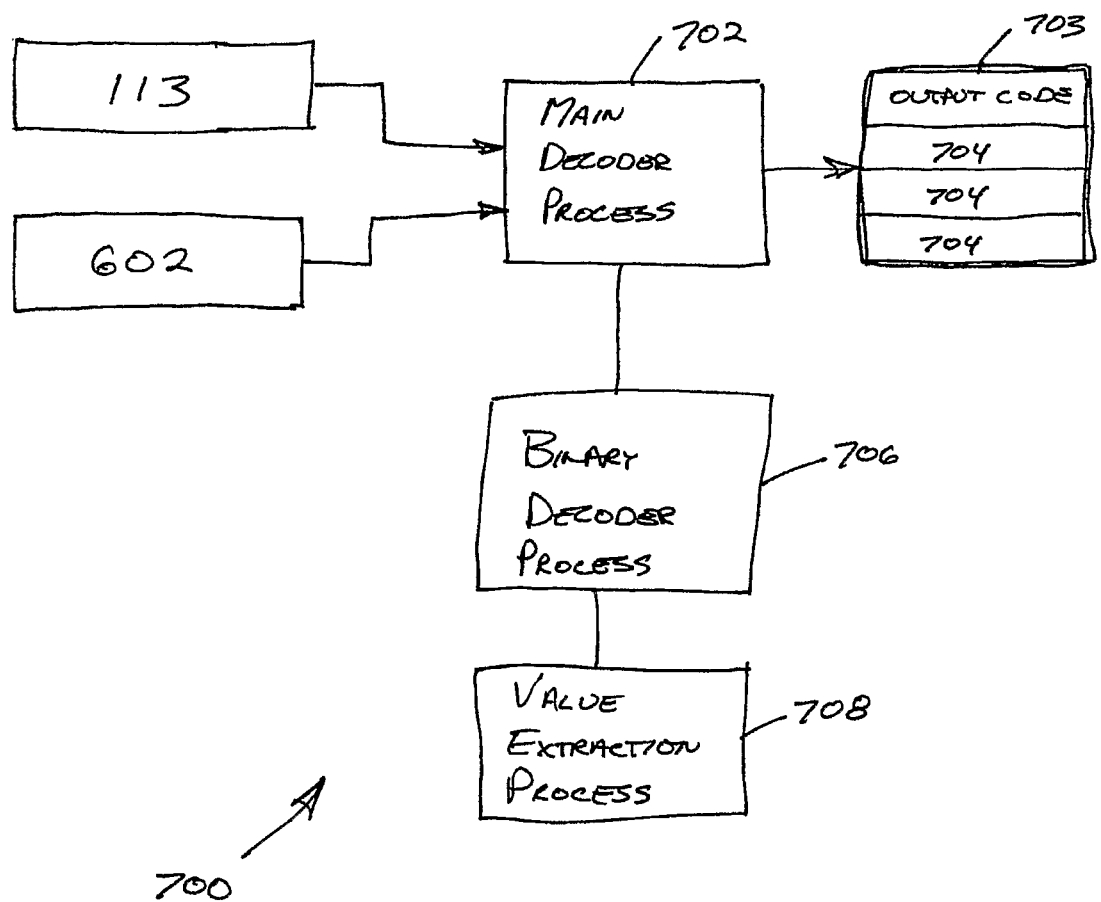
FIG. 7 depicts a block diagram of an exemplary embodiment of a generic instruction decoder.

FIG. 7 depicts a block diagram of one exemplary embodiment of a generic instruction decoder 700. Here, generic instruction decoder 700 is configured to automatically decode instructions 114 described with the generic instruction model 600. The complexity of the decoder 700 is O(n*m*log 2m), where n is the number of operations in the input binary program 114 and m is the number of operations in the instruction specification 602. Preferably, generic decoder 700 includes three functional processes for decoding. Main decoder process 702 accepts the target program binary 113 and the instruction specification 602 as inputs and generates output code 703, preferably in the form of a source file, containing the decoded instructions 704. The pseudo code of an exemplary embodiment of main decoder process 702 is shown in Table 8 below:

TABLE 8

Main decoder process 702

Input: Target Program Binary Appl, Instruction Specifications InstSpec;
Output: Decoded Program DecodedOperations;

TABLE 8-continued

Main decoder process 702

```
Begin
   Addr = Address of first instruction in App;  DecodedOperations={ };
   While (Appl not processed completely)
      BinStream = Binary stream in Appl starting at Addr;
      (Exp, AddrIncrement) = DecodeOperation (BinStream, InstSpec);
      DecodedOperations = DecodedOperations U <Exp, Addr>;
      Addr = Addr + AddrIncrement;
   EndWhile;
   return DecodedOperations ;
End;
```

Main decoder process 702 iteratively processes the target binary 113, by locating an instruction 114 and then decoding the instruction 114 using binary decoder process 706 so that the decoded instruction 704 can be added to the output source file 703. In addition to returning the decoded instruction 704, binary decoder 706 also returns the length of the current instruction 114 to be used to determine the beginning of the next instruction 114. The pseudo code of an exemplary embodiment of binary decoder process 706 is shown below in TABLE 9:

TABLE 9

Binary decoder process 706

```
Input: Binary Stream BinStream, Specifications Spec;
Output: Decoded Expression Exp, Integer DecodedStreamSize;
Begin
   (OpDesc, OpMask) = findMatchingPair(Spec, BinStream);
   OpBinary = initial part of BinStream whose length is equal to OpMask;
   Exp = the expression part of OpDesc;
   ForEach pair of (s, T) in the OpDesc
      Find t in T whose mask matches the OpBinary;
      v = ValueOf(t, OpBinary);
      Replace s with v in Exp;
   EndFor
   return (Exp , size(OpBinary));
End;
```

Binary decoder 706 accepts the binary instruction 114 and the instruction specification 602 containing the corresponding instruction descriptions 604 for each instruction class 402. The binary instruction 114 is compared with the instruction description masks 605 to find the instruction description 604 that matches with the instruction binary 114. The length of the matched mask 605 preferably defines the length of the instruction 114 to be decoded. The symbol types 608 are then determined by comparing the masks 612 with the binary instruction 114.

The binary decoder 706 then calls the value extraction process 708, which accepts a symbol type 608 and the operation binary (OpBinary) and returns the actual value of the symbol 606 to the binary decoder 706. The OpBinary bits are the bits in a slot 610 in the instruction 114 that describe the operation 620. The number of bits in the OpBinary can be determined by the length of the mask 612. The pseudo code of an exemplary embodiment of the value extraction process 708 is shown in TABLE 10 below:

TABLE 10

Value extraction process 708

```
Input: Type t, Operation Binary OpBinary;
Output: Extracted Value extValue;
Begin
   Switch (t)
      case #type, value#: extValue = (type) value;
      endcase
      case #type, i, j#: extValue = (type) OpBinary[i:j];
      endcase
      case [regClass, index]: extValue = REGS[regClass][index];
      endcase
      case [regClass, i, j]: extValue = REGS[regClass][ OpBinary[i:j]];
      endcase
      case Operation Spec: (extValue, tmp) =
         DecodeOperation(OpBinary, t);
         endcase
   EndSwitch;
   return extValue;
End;
```

If the symbol type 608 is a micro-operation, then value extraction process 708 calls the binary decoder 706 again to decode the micro-operation. If the symbol type 608 is a constant, the value extraction process 708 returns the constant value. If the symbol type 608 is a type other than a fixed constant (register), value extraction process 708 calculates the value by interpreting the proper portion of the operation binary (OpBinary[i:j]) as a constant (register index). Finally, each symbol 606 in the expression 610 is replaced with the values of the symbol 606 as determined from the instruction binary 114 using the value extraction process 708. Binary decoder 706 then produces this expression 610 and the length of the decoded instruction 114 as outputs.

TABLE 11 below shows an example of a SPARC Add instruction 114 with the corresponding binary pattern:

TABLE 11

| Add g1, #10, g2 | 31 1000-0100 | 23 0000-0000 | 15 0110-0000 | 7 0000-1010 |
|---|---|---|---|---|

This example instruction 114 can be decoded using generic decoder 700. Main decoder process 702 calls binary decode process 706 to locate the correct instruction description 604. Here, the mask 605 for IntegerOps instruction description 604 matches the instruction binary 114, indicating that the IntegerOps description 604 is the proper description 604. Binary decode process 706 then calls the value extraction process 708 to extract the values of, or decode, the IntegerOps symbols 606, opcode, dest, src1, src2.

The type 608 of the opcode symbol 606 is OpTypes 609, in which the mask 612 of the Add operation matches the relevant portion of the instruction binary 114. The value extraction process 708 then returns the value of the opcode symbol 606 as the Add operation. The type 608 of the dest symbol 606 is DestType 609, which is a register type. Dest 606 is an integer register whose index is bits 25th to 29th (00010), i.e. 2. The values of the src1 and src2 symbols 606 can be extracted by the value extraction process 708 in a similar manner. Binary decoder 706 then replaces each symbol 606 in the IntegerOps expression 610 with the extracted value, resulting in: g2=Add (g1, 10) or equivalently, g2=g1+10.

As described above, the generic instruction model 600 and the generic decoder 700 can be configured to rely mainly on the instruction descriptions 604 to extract the values of the symbols 606 occurring within an instruction 114. These values can be used either statically or dynamically, such as in a conditional statement, to generate the proper source code of an ISA simulator. For at least this reason, the generic instruction model 600 and the generic decoder 700 can be used in or with any simulation technique.

Figure 8:
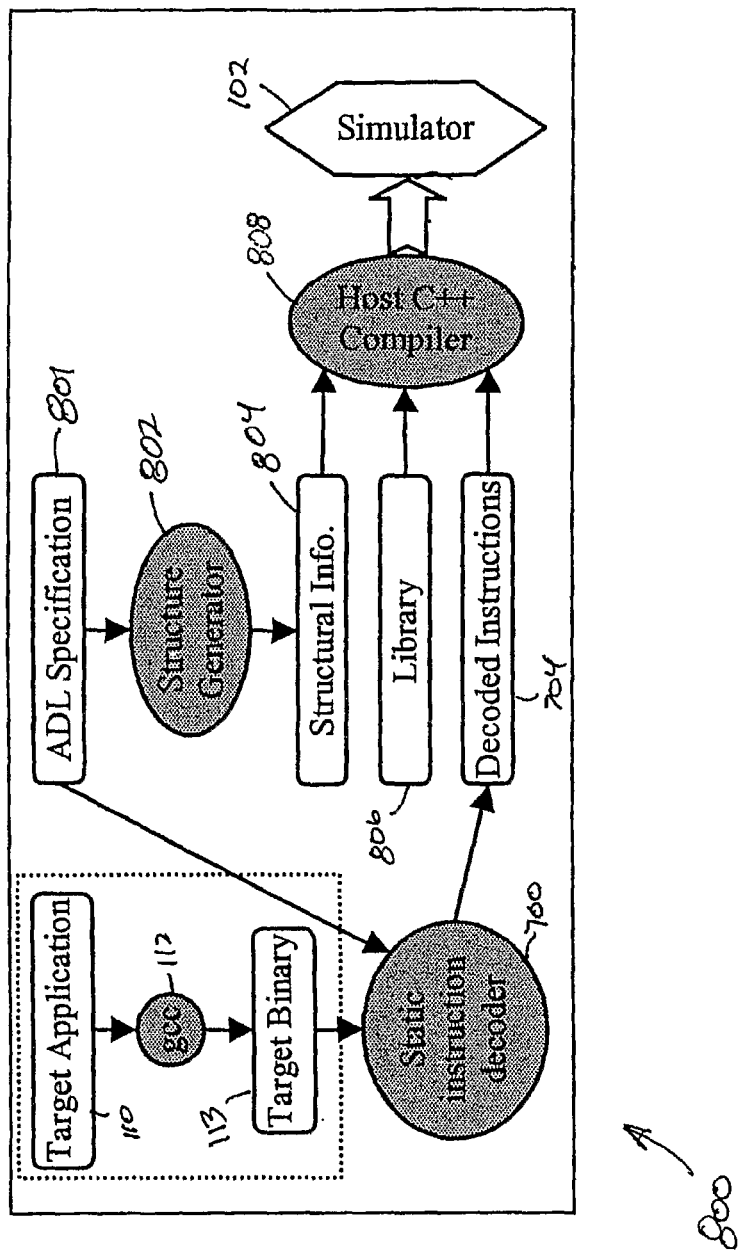
FIG. 8 depicts a block diagram of an exemplary embodiment of a retargetable simulation framework.

For instance, the generic instruction model 600 and the generic decoder 700 can be used with any simulation method to generate a retargetable simulation framework capable of efficient retargeting from one target ISA to another. FIG. 8 depicts one exemplary embodiment of a retargetable simulation framework 800 where the IS-CS method 100 is integrated with the generic decoder 700 to allow the decoding of a target ISA modeled with the generic instruction model 600.

In this exemplary embodiment, the generic instruction model 600 is generated in an ADL. Here, the ADL specification 801 of the target ISA is used with the compiled target program binary 113 to generate the IS-CS simulator 102. The instruction specification 602 and any instruction descriptions 604 are preferably generated using the ADL. A template 404 is preferably generated from each instruction description 604, either manually or automatically. The templatized description of model 600 is used to generate both the C++ template 404 as well as the decoder 700. For each symbol 606 in the description 604, the template 404 preferably has a corresponding parameter in its parameter list. Decoder 700 preferably replaces these parameters with the extracted values of the symbols 606. The instruction specification 602, along with the templates 404 and the instruction binary 113 are all input to the generic decoder 700, which decodes one instruction 114 at a time and customizes a selected template 404 to generate decoded instructions 704.

As mentioned above, the IS-CS method 100 can be based on a partial evaluation technique. In the generic instruction model 600, all of the instruction formats in the target ISA and their corresponding functions can be constructed by generating all of the permutations of the symbol values in an instruction class 402. The number of generated formats (functions) can be controlled by excluding some of the symbols 606 or iterating only on a subset of symbol values. Thus, the model 600 allows control of the level of optimizations and number of generated formats using the same relatively compact instruction description 602.

The structure generator 802 preferably compiles the structural information 804 of the instruction specification 602 into components and objects that are configured to track the state of the simulated processor. This structural information 804 is preferably compiled in the form of source code configured to instantiate these components and objects at run time. The objects of structural information 804 are instantiations of components of the library 806. The components of 806 include hardware (such as memories and latches), and software (such as software-caches for decoded information).

Any components which do not depend on the specific target ISA, i.e., target independent components, are preferably described in library 806. The library 806 can be combined with the structural information 804 and the decoded instructions 704 and compiled on the host machine 808 to generate optimized source code of the simulator 102. The library 806 preferably designates the simulator to be used, which in this case is the IS-CS simulator 102. Other simulators can be used with the generic model and decoder 700 by modifying the designation in library 806. This optimized source code 810 is then preferably stored in instruction memory 122 and used for the IS-CS simulator 102. The retargetable simulation framework is also described in M. Reshadi et al. "*An Efficient Retargetable Framework for*

*Instruction-Set Simulation*" CODES+ISSS'03, Oct. 1-3, 2003, pp. 13-18, which is fully incorporated by reference herein.

In the foregoing specification, the invention has been described with reference to specific embodiments thereof. It will, however, be evident that various modifications and changes may be made thereto without departing from the broader spirit and scope of the invention. For example, each feature of one embodiment can be mixed and matched with other features shown in other embodiments. Features and processes known to those of ordinary skill may similarly be incorporated as desired. Additionally and obviously, features may be added or subtracted as desired. Accordingly, the invention is not to be restricted except in light of the attached claims and their equivalents.

What is claimed is:

1. A method of simulating an instruction set architecture (ISA) with an instruction set simulator (ISS), comprising:
   generating decoder source code for an original input application, prior to a simulation time, by decoding each instruction of a plurality of instructions in the original input application, wherein the decoding comprises:
      identifying a plurality of unique instruction patterns in the original input application;
      selecting an appropriate template from a plurality of templates for each unique instruction pattern of the plurality of unique instruction patterns, wherein each template of the plurality of templates is configured to implement a functionality of an instruction contained within an instruction class, the instruction class describing a set of instructions of the instruction set architecture having a common behavior;
      generating a customized template for each instruction of the plurality of instructions by extracting values from each instruction and assigning the extracted values to parameters within the template;
      instantiating the customized template; and
      appending the customized template and corresponding instantiation code into the decoder source code;
   compiling the decoder source code including optimizing the decoder source code through partial evaluation to generate an optimized decoder having optimized decoded instructions of the original input application;
   executing the optimized decoder to simulate the original input application, comprising:
      loading, at a simulation time, the optimized decoded instructions of the original input application into instruction memory;
      fetching, at a run time, an instruction binary of the optimized decoded instruction from instruction memory;
      determining, at the runtime, whether the fetched instruction binary has been modified since a time of decoding;
      if the fetched instruction binary has been modified since a time of decoding:
         decoding, at the runtime, the modified instruction to generate a redecoded instruction by selecting one of an optimized decoded template or a decoding mechanism comprising function pointers; and
         executing one of the decoded instruction or the redecoded instruction.

2. The method of claim 1, wherein each template has a corresponding mask used to identify instructions belonging to the instruction class.

3. The method of claim 2, wherein selecting an appropriate template comprises comparing the instruction to the mask corresponding to the template and selecting the template if the mask matches the instruction.

4. The method of claim 1, wherein executing comprises using an interpretive process.

5. A system, comprising:
   hardware including a processor; and
   a computer-readable medium having stored thereon a generic instruction model, the generic instruction model executable by the processor in an instruction set simulator (ISS), the generic instruction model comprising an instruction specification used to interpret each instruction in an instruction set architecture (ISA), wherein the instruction set simulator is configured to perform
   generating decoder source code for an original input application, prior to a simulation time, by decoding each instruction of a plurality of instructions in the original input application, wherein the decoding comprises:
      identifying a plurality of unique instruction patterns in the original input application;
      selecting an appropriate template from a plurality of templates for each unique instruction pattern of the plurality of unique instruction patterns, wherein each template of the plurality of templates is configured to implement a functionality of an instruction contained within an instruction class, the instruction class describing a set of instructions of the instruction set architecture having a common behavior;
      generating a customized template for each instruction of the plurality of instructions by extracting values from each instruction and assigning the extracted values to parameters within the template;
      instantiating the customized template; and
      appending the customized template and corresponding instantiation code into the decoder source code;
   compiling the decoder source code including optimizing the decoder source code through partial evaluation to generate an optimized decoder having optimized decoded instructions of the original input application;
   executing the optimized decoder to simulate the original input application, comprising:
      loading, at a simulation time, the optimized decoded instructions of the original input application into instruction memory;
      fetching, at a run time, an instruction binary of the optimized decoded instruction from instruction memory;
      determining, at the runtime, whether the fetched instruction binary has been modified since a time of decoding;
      if the fetched instruction binary has been modified since a time of decoding:
         decoding, at the runtime, the modified instruction to generate a redecoded instruction by selecting one of an optimized decoded template or a decoding mechanism comprising function pointers; and
         executing one of the decoded instruction or the redecoded instruction.

6. The system of claim 5, wherein the instruction specification comprises one or more operation classes, wherein each operation class defines a set of one or more instructions, the operation class having an operation mask used to identify instructions belonging to the instruction class.

7. The system of claim 6, wherein the operation class comprises one or more symbols and an expression describing the class in terms of the one or more symbols, each symbol having a corresponding set of one or more symbol types, each symbol type in the set comprising information used to determine the symbol when compared to the instruction.

8. The method of claim 7, wherein the type set comprises a plurality of operation types, each operation type having a corresponding type mask used to determine the operation when compared to an instruction.

9. The system of claim 6, wherein at least one operation class comprises plurality of expressions, each expression being conditional on data within the instruction.

10. The system of claim 6, wherein each instruction comprises a series of slots, each slot comprising data translatable into an operation.

11. The system of claim 6, wherein each instruction comprises a series of binary data values and an operation mask comprising a series of mask positions wherein each mask position corresponds to one instance of a binary data value.

12. The system of claim 11, wherein each mask position has a value selected from a group consisting of a binary one value, a binary zero value, and a do not care value.

13. A non-transitory computer readable medium having stored thereon a set of instructions executable by a machine to perform operations for simulating an instruction set architecture (ISA), said operations comprising:
    generating decoder source code for an original input application, prior to a simulation time, by decoding each instruction of a plurality of instructions in the original input application, wherein the decoding comprises:
        identifying a plurality of unique instruction patterns in the original input application;
        selecting an appropriate template from a plurality of templates for each unique instruction pattern of the plurality of unique instruction patterns, wherein each template of the plurality of templates is configured to implement a functionality of an instruction contained within an instruction class, the instruction class describing a set of instructions of the instruction set architecture having a common behavior;
        generating a customized template for each instruction of the plurality of instructions by extracting values from each instruction and assigning the extracted values to parameters within the template;
        instantiating the customized template; and
        appending the customized template and corresponding instantiation code into the decoder source code;
    compiling the decoder source code including optimizing the decoder source code through partial evaluation to generate an optimized decoder having optimized decoded instructions of the original input application;
    executing the optimized decoder to simulate the original input application, comprising:
        loading, at a simulation time, the optimized decoded instructions of the original input application into instruction memory;
        fetching, at a run time, an instruction binary of the optimized decoded instruction from instruction memory;
        determining, at the runtime, whether the fetched instruction binary has been modified since a time of decoding;
        if the fetched instruction binary has been modified since a time of decoding:
            decoding, at the runtime, the modified instruction to generate a redecoded instruction by selecting one of an optimized decoded template or a decoding mechanism comprising function pointers; and
        executing one of the decoded instruction or the redecoded instruction.

14. The non-transitory computer readable medium of claim 13, wherein the template corresponds to a first class of one or more instructions and wherein the template has a corresponding mask used to identify instructions belonging to the first class.

15. The non-transitory computer readable medium of claim 13, wherein executing comprises using an interpretive process.

* * * * *

UNITED STATES PATENT AND TRADEMARK OFFICE
CERTIFICATE OF CORRECTION

PATENT NO. : 8,621,444 B2
APPLICATION NO. : 10/599593
DATED : December 31, 2013
INVENTOR(S) : Dutt et al.

It is certified that error appears in the above-identified patent and that said Letters Patent is hereby corrected as shown below:

On the Title Page, in Item (57), under "ABSTRACT", in Column 2, Line 2, delete "a instruction set" and insert -- an instruction set --, therefor.

On Title Page 2, in Item (56), under "OTHER PUBLICATIONS", in Column 1, Line 7, delete ""Matering" and insert -- "Mastering --, therefor.

On Title Page 2, in Item (56), under "OTHER PUBLICATIONS", in Column 2, Line 13, delete "LAnguage" and insert -- Language --, therefor.

In the Specification

In Column 2, Line 29, delete "a instruction" and insert -- an instruction --, therefor.

In Column 2, Line 54, delete "a instruction" and insert -- an instruction --, therefor.

In Column 3, Line 33, delete "a instruction" and insert -- an instruction --, therefor.

In Column 3, Line 35, delete "an a" and insert -- an --, therefor.

In Column 9, Lines 58-59, delete "input program 114" and insert -- input program 113 --, therefor.

In Column 9, Line 63, delete "in," and insert -- in --, therefor.

In Column 13, Line 33, delete "description 602" and insert -- description 604 --, therefor.

In Column 16, Line 43, delete "description 602." and insert -- description 604. --, therefor.

Signed and Sealed this
Thirteenth Day of May, 2014

Michelle K. Lee
*Deputy Director of the United States Patent and Trademark Office*

In the Claims

In Column 19, Line 1, in Claim 8, delete "method" and insert -- system --, therefor.

In Column 19, Line 6, in Claim 9, delete "comprises" and insert -- comprises a --, therefor.